(12) United States Patent
Van Casteren

(10) Patent No.: US 7,282,865 B2
(45) Date of Patent: Oct. 16, 2007

(54) DEVICE AND METHOD FOR OPERATING A DISCHARGE LAMP

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 92 days.

(21) Appl. No.: 10/501,374

(22) PCT Filed: Dec. 23, 2002

(86) PCT No.: PCT/IB02/05719

§ 371 (c)(1),
(2), (4) Date: Jul. 14, 2004

(87) PCT Pub. No.: WO03/061352

PCT Pub. Date: Jul. 24, 2003

(65) Prior Publication Data
US 2005/0062432 A1 Mar. 24, 2005

(30) Foreign Application Priority Data
Jan. 15, 2002 (EP) .................................. 02075130

(51) Int. Cl.
*H05B 37/02* (2006.01)
(52) U.S. Cl. .................................. 315/209 R; 315/127
(58) Field of Classification Search ................ 315/127, 315/209 R
See application file for complete search history.

(56) References Cited

U.S. PATENT DOCUMENTS

| | | | | |
|---|---|---|---|---|
| 4,933,605 A | * | 6/1990 | Quazi et al. ................. | 315/224 |
| 4,977,351 A | * | 12/1990 | Bavaro et al. ................. | 315/87 |
| 5,187,414 A | * | 2/1993 | Fellows et al. ............. | 315/307 |
| 5,235,255 A | * | 8/1993 | Blom .......................... | 315/224 |
| 5,569,984 A | * | 10/1996 | Holtslag ...................... | 315/307 |
| 5,818,582 A | * | 10/1998 | Fernandez et al. .......... | 356/318 |
| 6,069,458 A | * | 5/2000 | Takehara et al. ............. | 315/307 |
| 6,343,021 B1 | * | 1/2002 | Williamson .................... | 363/8 |
| 6,384,544 B1 | * | 5/2002 | Greenwood et al. ........ | 315/291 |
| 6,963,178 B1 | * | 11/2005 | Lev et al. .................... | 315/307 |
| 2002/0047609 A1 | * | 4/2002 | Weng .......................... | 315/224 |
| 2003/0038602 A1 | * | 2/2003 | Lestician ..................... | 315/224 |

FOREIGN PATENT DOCUMENTS

| | | |
|---|---|---|
| EP | 0351012 A2 | 1/1990 |
| EP | 0507399 A2 | 10/1992 |

* cited by examiner

*Primary Examiner*—Don Wong
*Assistant Examiner*—Binh V Ho

(57) ABSTRACT

The invention relates to a device for operating a high-pressure discharge lamp, comprising: a switched-mode power supply circuit for supplying power to the high-pressure discharge lamp from a supply voltage, the power supply circuit comprising at least one power switching element, and control means for controlling the at least one power switching element in its switched-on and switched-off states for controlling the power or current supplied to the high-pressure discharge lamp. According to the invention the control means are adapted to control the power consumed by the lamp during its steady phase or the current consumed by the lamp during its run-up phase by controlling the on-time (Ton) of the switched-on state of the at least one power switching element.

18 Claims, 4 Drawing Sheets

DEVICE AND METHOD FOR OPERATING A DISCHARGE LAMP

This Application is a 371 of PTC/IB02/05719 Dec. 23, 2002.

The present invention relates to a device and method for operating a high-pressure discharge lamp.

High-intensity discharge (HID) lamps are operated during the steady state operation within a small power range to extend lamp life. Furthermore, during run-up operation the run-up current, i.e. the current directly after ignition, must satisfy strict conditions. The run-up current should be sufficient to allow a quick run-up, but not too large to damage the lamp.

In the drive circuitry for driving the lamp or ballast circuit, the power level during steady state and the current level during the run-up phase must be controlled. More specifically, in steady state the power supplied to the lamp should be kept in a narrow power band, independent of the lamp voltage (within the normal lamp specifications) and also the run-up current must be limited to fulfill the given lamp specifications.

Typically the ballast circuit for driving the lamp comprises a switched-mode power supply (SMPS) connected between the mains and the lamp. As HID lamps are susceptible to acoustic resonance at high frequencies, HID lamps are to be driven at relatively low frequency (typically 100 Hz) in a square-wave current operation.

In a three stage drive circuit design the switched-mode power supply for HID-applications comprises a first stage including a preconditioner, for example a double rectifier for rectifying the mains (230 V 50 Hz), combined with an up-converter. The second stage comprises a down-converter (DC-DC converter), also called a forward or buck converter, for stabilizing the output current. The third stage of the ballast circuit comprises a commutator half or full bridge (and ignitor) to implement the square-wave current operation. The above-mentioned power control during steady state and current control during run-up phase is implemented with a feedback loop. The actual output power level of the down-converter can be determined by means of measuring the input current of the down-converter. A control circuit is provided for controlling the output of the down-converter. Assuming the input voltage is constant, the input current of the down-converter is linearly related to the input power. Assuming further that the losses in the down-converter are constant, the control circuit is able to control the output power of the down-converter, based on the measured input current. Consequently, the output current level during steady state is controlled by measuring the input current of the down-converter and providing the measured input current to the control circuit. This type of control, in case of critical discontinuous mode of operation, is called the $I_{peak}$ control. For low lamp voltages, which indicate the run-up phase, the output current of the down-converter instead of the output power is to be controlled and is set at a fixed value as specified for the particular type of lamp used. More specifically, the output current is limited, i.e. the maximum down-converter current is set to the run-up current. For low lamp voltages the constant power feedback saturates and the current is limited.

A drawback of the above feedback control is that it can be too slow to sufficiently stabilize the lamp ballast interaction. For certain types of lamps and for lamps operated on reduced power levels (dimmed lamps) the operating device can become unstable and the lamp may go out. For other, less critical types of lamps the operation may be stable to a certain degree. However, the performance of the operating device may be rather poor due to for example overshoot-effects after commutation. One of the reasons is that the sensed input current must be filtered to eliminate disturbances of the control loop caused by the switching process. A further drawback is that the feedback control can become unstable. The feedback control further requires relatively complex circuitry.

In a further simplified two-stage ballast design the down-converter and commutator bridge are replaced by a half-bridge commutating forward (HBCF) or a full-bridge commutating forward (FBCF) topology. In this topology, however, it is difficult or complicated to measure the peak current, especially in the HBCF topology, necessary to implement a control of the peak current ($I_{peak}$ control).

It is therefore an object of the present invention to provide a switched-mode power supply for high-intensity discharge lamps wherein the lamp power during steady state and lamp current during run-up phase can be controlled and wherein the above mentioned drawbacks are obviated.

This object is achieved according to the invention in a device for operating a high-pressure discharge lamp, comprising:

a switched mode power supply circuit for supplying power or current to the high-pressure discharge lamp from a supply voltage, the power supply circuit comprising at least one power switching element;

control means for controlling the at least one power switching element in its switched-on and switched-off states for controlling the power or current supplied to the high-pressure discharge lamp;

wherein the control means are adapted to control the power consumed by the lamp during its steady phase or the current consumed by the lamp during its run-up phase by controlling the on-time ($T_{on}$) of the switched-on state of the at least one power switching element. Forward control without any feedback or measurement by means of controlling the on-time ($T_{on}$) of the switched-mode power supply provides a stable and simple control circuit. Also the speed of the control corresponds with the switching frequency of the switched-mode power supply and consequently is larger than the control speed in case of using a standard feedback control. Typically a standard, high-speed feedback control provides a control speed of about 1 kHz or less. The control speed according to the invention is equal to the switching frequency of the switched-mode power supply and is typically at least 100 kHz.

Preferably the value of the on-time ($T_{on}$) of the at least one power switching element is a preset value, the preset value depending on the specifications of the type of discharge lamp used. During steady phase, each discharge lamp type is to be driven in a relatively narrow power band which is characteristic of the lamp type. Moreover, the lamp is to be driven in this power band substantially independently of changes in the lamp voltage. For each type of discharge lamp the reference power at which the lamp is to be driven is known. Consequently, the on-time ($T_{on}$) of the power switching element/elements is preset such that the lamp is driven at the specified reference power.

In case of lamps with a relatively small variation in lamp voltage during life or in case of lamps which are less susceptible to variations, the on-time ($T_{on}$) of the at least one power switching element for a specific discharge lamp type is preferably substantially constant during operation of the lamp. Therefore, a relatively simple circuit design will be sufficient.

However, in case of critical lamps, lamps with a relatively large variation in lamp voltage during life, or lamps which require an exact power level for good color properties, and/or in case the ballast is provided with the option of dimming the lamp, the power control is preferably extended with a relatively slow feedback control to guarantee a constant wattage over a broad range. This low-speed feedback uses the input current of the down-converter, HBCF or FBCF topology as input for the feedback loop. This feedback loop guarantees a correct power level over a broad voltage range. More specifically, in a further preferred embodiment of the invention the device comprises:

input current determining means for determining the input current of the power supply, the input current determining means providing a signal representative of the determined input current;
a feedback means through which said signal is fed back to the control means, wherein the control means are adapted to control the on-time ($T_{on}$) of the at least one switching element as a function of said feedback signal Furthermore, to improve the behavior of the power control in case of application of HBCF or FBCF topologies wherein the depolarization process of the output capacitor may cause unwanted high peak currents during commutation, a relatively simple high-speed feedback control is preferably added. This high-speed feedback uses the lamp voltage as input for the feedback loop. More specifically, in a further preferred embodiment of the invention the device comprises:

voltage determining means for determining the lamp voltage, the voltage determining means providing a signal representative of the determined lamp voltage,
a feedback means through which said signal is fed back to the control means; wherein the control means are adapted to control the on-time ($T_{on}$) of the at least one power switching element as a function of said feedback signal. The iteration frequency of the additional fast feedback control is equal to or slightly less than the switching frequency of the switched-mode power supply.

The control means may comprise an additional power controller which processes the feedback signal and operates a separate controller means for controlling the $T_{on}$-time of the power switching element/elements. The two controllers also may be combined.

In another preferred embodiment the device comprises dim level means for setting a reduced lamp power level, the dim level means providing a signal representative of the dim level of the lamp, wherein the control means are adapted to control the on-time ($T_{on}$) of the at least one power switching element as a function of said signal. The control means may comprise an additional power controller which processes the dim signal and operates a separate controller for controlling the $T_{on}$-time of the power switching element/elements. The simple fast or slow feedback controller respectively, for precise power adjustments, the $T_{on}$ time controller and/or possibly the additional dim level controller may also be combined to one single device.

The additional controller may be implemented in a low-performance microprocessor, because the speed of the A/D-converters is not critical for the relatively slow average power adjustments.

The iteration frequency of the additional slow feedback control is 100 Hz or less, preferably about 10 Hz or less.

Since the on-time ($T_{on}$) can be iteratively adapted with a iteration frequency far lower than the switching frequency of the switched-mode power supply, the fast power disturbances are controlled by the $T_{on}$-forward control, while the slow power disturbances are controlled by the additional feedback circuit.

According to another aspect of the invention a method is provided for operating a high-pressure discharge lamp, comprising:
supplying power to the high-pressure discharge lamp from a supply voltage, using at least one power switching element;
controlling the power consumed by the lamp during its steady phase using control means;
wherein said control means control the lamp power during the steady state of the lamp by fixing the on-time ($T_{on}$) of the at least one power switching element.

Preferably the method comprises also the steps of presetting the value of the on-time ($T_{on}$) of the at least one power switching element depending on the specifications of the type of discharge lamp used.

Further advantages, features and details of the present invention will be elucidated with reference to the annexed drawings, in which.

Figure 1:
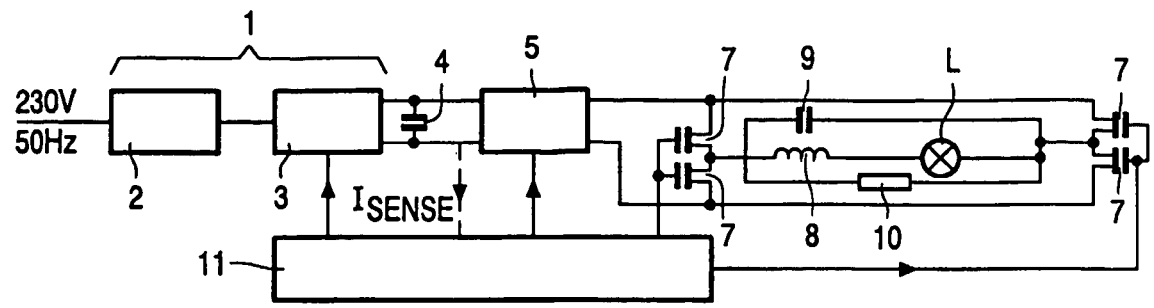
FIG. 1 shows a schematic diagram of a lamp and its ballast circuit for driving the lamp.

FIG. 1 shows a three-stage ballast for a high-discharge lamp L comprising a preconditioner 1, which includes a rectifier 2 for converting the AC supply voltage (typically a 230 V 50 HZ mains) to a DC supply voltage and an up-converter 3. The ballast furthermore comprises an energy buffer 4, a down-converter 5 and a full bridge commutator 6 for driving the lamp L in a square-wave operation. The full bridge commutator 6 comprises four MOSFETS 7, a series igniter inductor 8 or an igniter transformer 8, a lamp capacitor 9 and a separate ignitor circuit 10 for driving the lamp in the ignition phase. The preconditioner 1, down-converter 5 and commutator 6 are controlled by a control circuit 11.

In broken lines is shown the prior feedback control loop. The input current Isense of the down-converter 5 is measured and fed back to the control circuit 11. Based on the measured input current Isense, the control circuit 11 controls the down-converter so as to set the output power (steady state) or output current (run-up state) of the down-converter 5 to the desired level.

Figure 2:
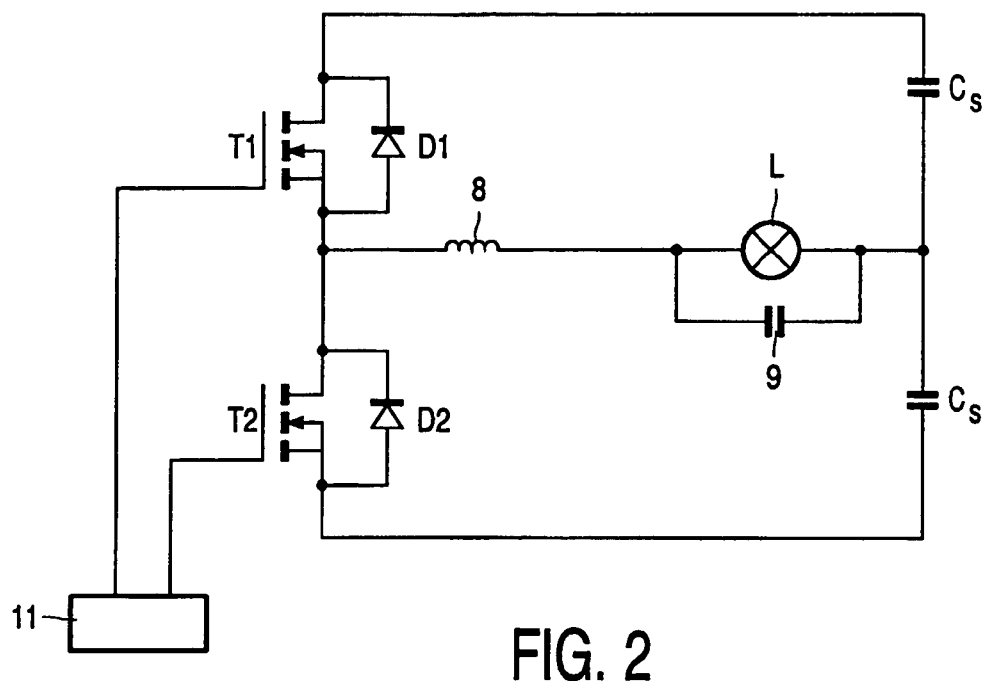
FIG. 2 shows a schematic circuit diagram of a half-bridge commutating forward (HBCF) topology of a switched-mode power supply.

In FIG. 2 is shown the end part of a two-stage ballast for a high-discharge lamp. In the two-stage ballast the circuitry of the last two stages of the three stage ballast are combined. Compared to the three-stage ballast the two-stage ballast is simple and the cost of manufacturing is relatively low. The half bridge commutating forward (HBCF) circuit of FIG. 2 shows a first MOSFET T1, a second MOSFET T2, a first and a second diode D1 and D2, a lamp inductor 8, a lamp capacitor 9, the lamp L and two capacitors $C_s$. Instead of a half bridge a full bridge is conceivable, wherein the capacitors $C_s$ are replaced by MOSFETS. The half bridge commutating forward circuit or full bridge commutating forward circuit is operated in the critical discontinuous mode to allow zero voltage switching. Each half commutation period (commutation frequency of the order of 100 Hz), one MOSFET (T1 or T2) is operated in combination with the diode (D2 or D1) of the other MOSFET.

Figure 3:
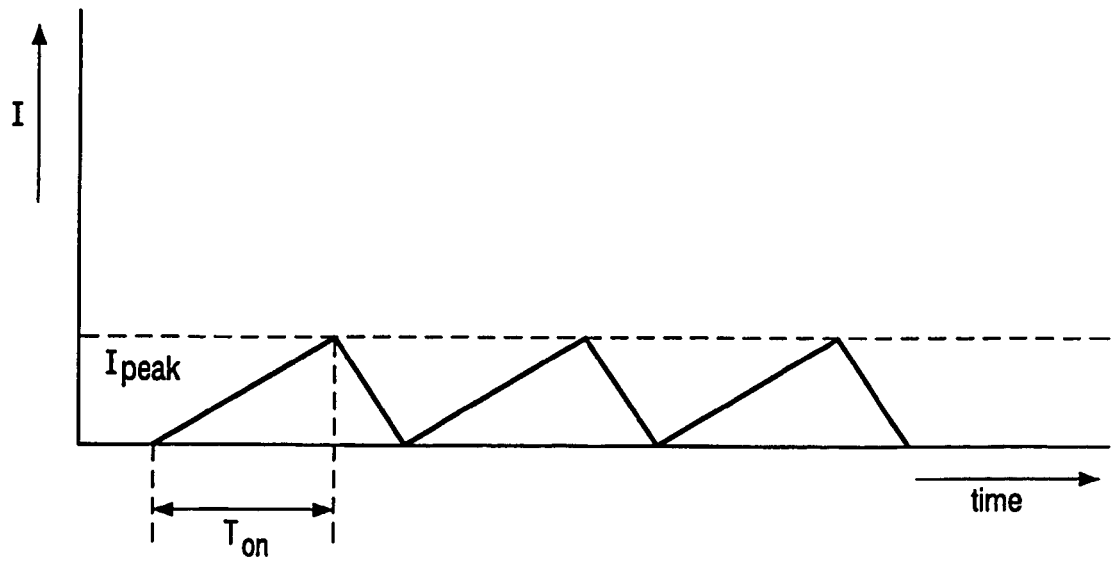
FIG. 3 shows a graph of the current (I) supplied by the switched-mode power supply, as a function of time (t) in case the switched-mode power supply is operated in a critical discontinuous mode.

The average level of the output current of the three-stage down-converter circuit or the two-stage half/full bridge commutating forward circuit (FBCF/HBCF) when operated in the discontinuous mode, is determined by the minimum and the maximum level of the current or the time $T_{on}$ during which the MOSFETS of the circuit is active (switched-on state). When operated in the critical discontinuous mode, wherein the minimum current level is zero, however, the level of the output current can be determined by the $T_{on}$-time or the maximum current value $I_{peak}$ only, as is shown in FIG. 3.

Figure 5:
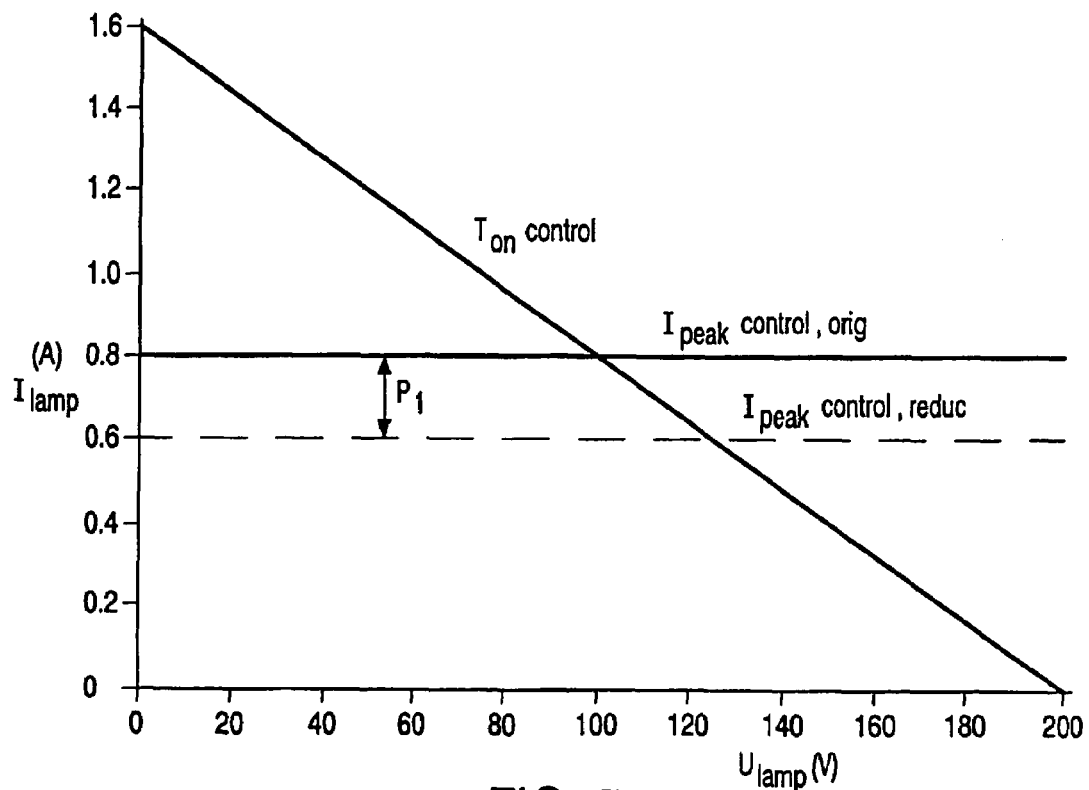
FIG. 5 shows a graph of the lamp current ($I_{lamp}$) as a function of the lamp voltage ($U_{lamp}$) for constant $I_{peak}$-control and for constant $T_{on}$-control.

In table I are shown the equations valid for $I_{peak}$ control which is implemented in the feedback control mentioned earlier. The constant current $I_{peak}$ control is further elucidated in FIGS. 5 and 6, wherein the lamp current $I_{lamp}$ and the lamp power $P_{lamp}$ are shown as a function of the lamp voltage $U_{lamp}$.

TABLE I

Lamp power and lamp current equations for constant $T_{on}$ control and constant $I_{peak}$ control

| | $I_{peak}$ control | $T_{on}$ control |
|---|---|---|
| $I_{L,peak}$ | $I_{L,peak}$ = constant | $I_{L,peak} = \frac{(U_{supply} - U_{lamp}) \cdot T_{on}}{L}$<br>$T_{on}$ = constant |
| $I_{lamp}$ | $I_{lamp} = \frac{I_{L,peak}}{2}$ = constant | $I_{lamp} = \frac{(U_{supply} - U_{lamp}) \cdot T_{on}}{2L}$<br>$T_{on}$ = constant |
| $P_{lamp}$ | $P_{lamp} = U_{lamp} \cdot I_{lamp}$<br>$I_{lamp}$ = constant | $P_{lamp} = (U_{supply} \cdot U_{lamp} - U_{lamp}^2)\left(\frac{T_{on}}{2L}\right)$<br>$\frac{T_{on}}{2L}$ = constant |

Figure 4:
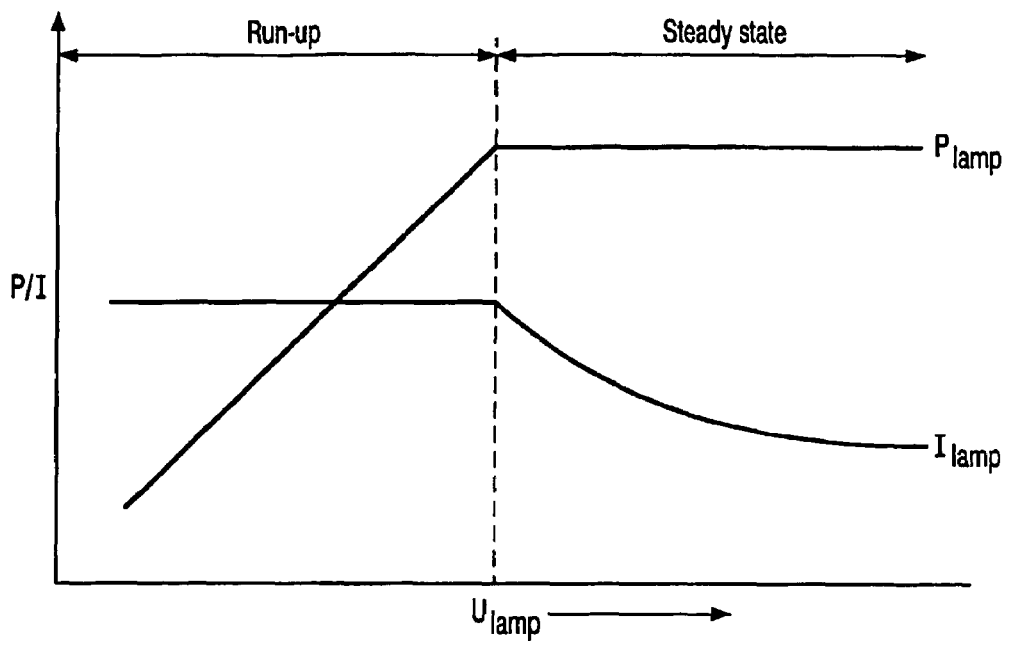
FIG. 4 shows a graph of the lamp power ($P_{lamp}$) and lamp current ($I_{lamp}$) during the run-up phase and the steady phase, as a function of the lamp voltage ($U_{lamp}$)

In the run-up phase, which is shown in the left part of FIG. 4, the lamp voltage is relatively low (typically 20 V) and the lamp current level $I_{lamp}$ is maintained constant at a reduced level. The level is dependent on the specifications of the particular lamp in use. The theoretical power curve in the run-up phase shows a diagonal line. This is true for a short time scale. During steady state, shown in the right part of this Figure, the power level instead of the current level is to be kept constant. Hence, for higher voltages the feedback control loop comes into action and stabilizes the power to a constant level, independent of the lamp voltage. The feedback loop will provide a constant power line over a broad lamp voltage range in steady state.

In case of using a feedback loop, the output current value is adapted during steady state by the feedback control circuit 11 to such an extent that a constant power level is maintained. If, for example, the lamp voltage changes from 100 V to about 115 V, the lamp power would rise from 80 W (a) to 92 W (b). To avoid this and, therefore, to keep the power level $P_{lamp}$ constant, the feedback control reduces the output lamp current from 0.8 A to 0.7 A (arrow $P_1$ in FIG. 5). This results in a reduction of the power level (arrow $P_2$ in FIG. 6) so as to keep the power level $P_{lamp}$ constant. In these Figures the continuous thin line and the broken thin line represent the lamp current and lamp power values in case of a constant $I_{peak}$ control, before (orig) or after (reduc) respectively, the feedback control intervenes.

In the feedback loop the switching behavior must be filtered out to avoid instabilities in the closed loop. This slows down the response time constant to several times below the switching frequency.

In the constant $T_{on}$ control according to the invention, the equations valid in the critical discontinuous mode are given on the right-hand side of table I. The constant $T_{on}$ control is further elucidated by the thick lines shown in FIGS. 5 and 6.

Figure 6:
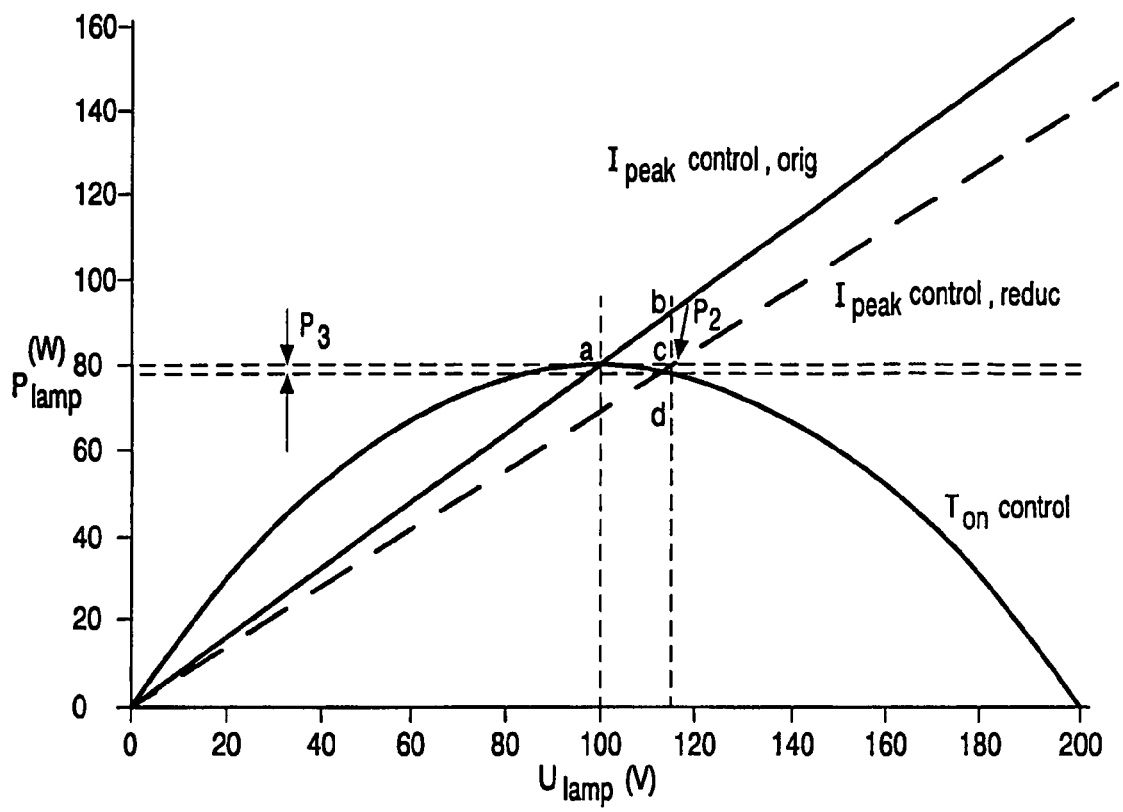
FIG. 6 shows a graph of the lamp power ($P_{lamp}$) as a function of the lamp voltage ($U_{lamp}$) for constant $I_{peak}$-control and for constant $T_{on}$-control.

In case the control circuitry 11 controls the time during which the switched-mode power supply is in the switched-on and/or the switched-off state ($T_{on}$-control), the lamp power curve shows a parabolic shape, as is clearly shown in FIG. 6, the power curve being the same on a short time scale as in steady state. The $T_{on}$-time of the power supply is preset by the control circuitry 11 to a value wherein the voltage supplied to the lamp corresponds to the nominal or reference lamp voltage, for example a reference lamp voltage of 100 V (point a). As shown in FIG. 6, the power level for a preset $T_{on}$-time is substantially constant within a considerable wide voltage range. The present generation of high-discharge lamps typically shows a 5% variation in nominal lamp power at the most. However, even in case of a 15% variation of the lamp voltage (for example a 15% increase from 100 V to 115 V), such as due to a voltage peak as a result of re-ignition of the lamp, this only results in a relatively small reduction of the lamp power $P_{lamp}$ (point d). Consequently, in the voltage range from 100 to 115 V the lamp power is more or less constant. The reduction is less than 5% ($P_3$), which in practical applications is acceptable. Although the power is not exactly constant as a function of the voltage, it is acceptably flat within a reduced lamp voltage range.

For very large variations, for example for very high lamp voltages, the power level is furthermore reduced automatically, which results in good end-of-life behavior and reduces end-of-life problems.

The above description of the constant $T_{on}$-time control shows that, with a fixed input voltage of the switched-mode power supply, the desired output can be attained and feedback circuitry that must be applied in the constant $I_{peak}$ control can be omitted. Furthermore, the use of a fixed forward control with a fixed setting gives a stable lamp power control and run-up current control, and provides a fast response, i.e. a response substantially equal to the switching frequency (100 kHz) of the commutator, which enables transients to be followed. Additionally a relatively simple circuit design will suffice.

In the above embodiment the $T_{on}$-time is kept constant to achieve a substantially constant lamp power level or reference power level. In applications wherein a user is given the opportunity to dim the lamp power level or when critical lamps or lamps showing a large variation in lamp voltage during life are applied, the "feed forward" control according to a further preferred embodiment is extended with a relatively slow feedback control. This additional feedback control enables the preset $T_{on}$-time of the power supply to be reduced in order to dim the lamp power to a desired dimmed power level or guarantees a more constant lamp power over a broad voltage range in case of critical lamps.

Furthermore, also in case of a two-stage power supply using HBCF- or FBCF-topology, according to a preferred embodiment, an additional, relatively fast feedback may be needed. Directly after commutation, i.e. after every current reversal, very high current peaks flow through the inductor which is caused by the depolarization process of the output capacitor. Also the current must be reduced in the run-up phase and in a situation of short-circuit. Therefore, to avoid saturation of the HBCF-/FBCF-coil, the $T_{on}$-time should be reduced for a low lamp voltage.

Figure 7A:
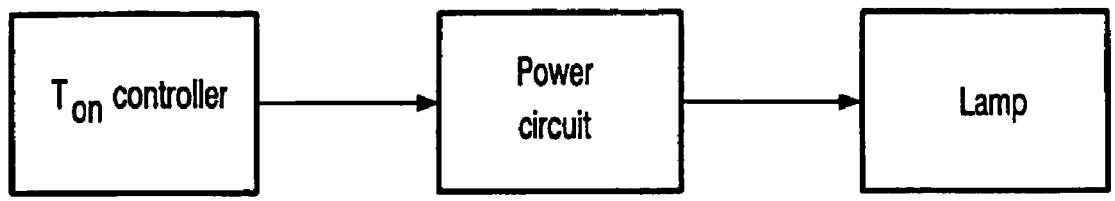
FIG. 7a shows a schematic diagram of the power controller without feedback.
Figure 7B:
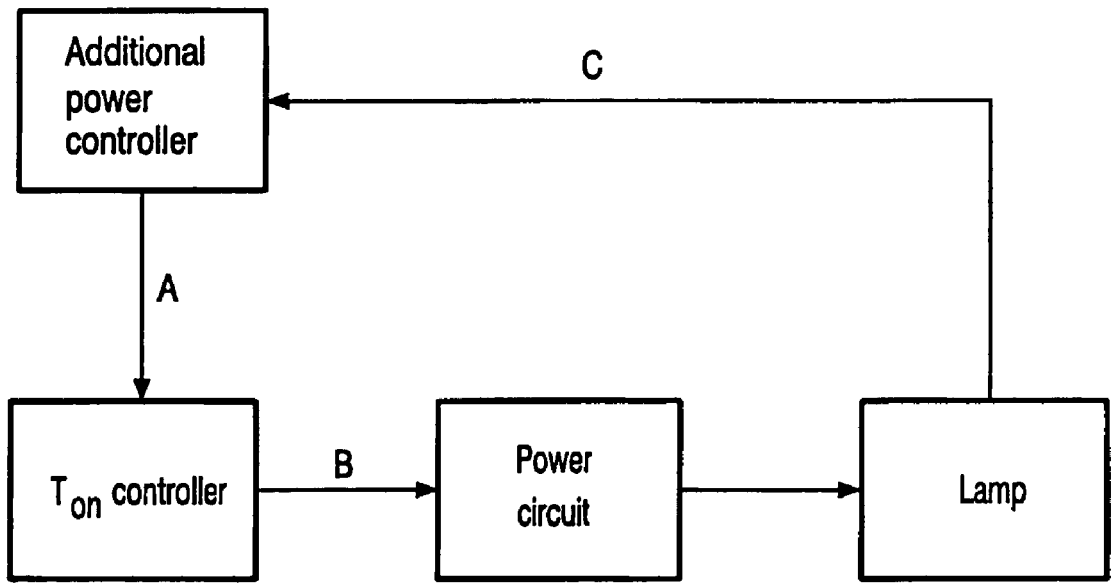
FIG. 7b shows a schematic diagram of an additional feedback power controller of a further preferred embodiment.

FIG. 7a is a schematic representation of the $T_{on}$ power or current control without using any additional feedback, as explained above. FIG. 7b is a schematic representation of the $T_{on}$ power or current control wherein an additional feedback is applied.

The additional control loop can be implemented in a low-performance microprocessor system because the speed of the A/D-converters is not critical for the slow average power adjustment. The fast power disturbances are controlled by means of the forward control part $T_{on}$ described earlier.

Figure 8:
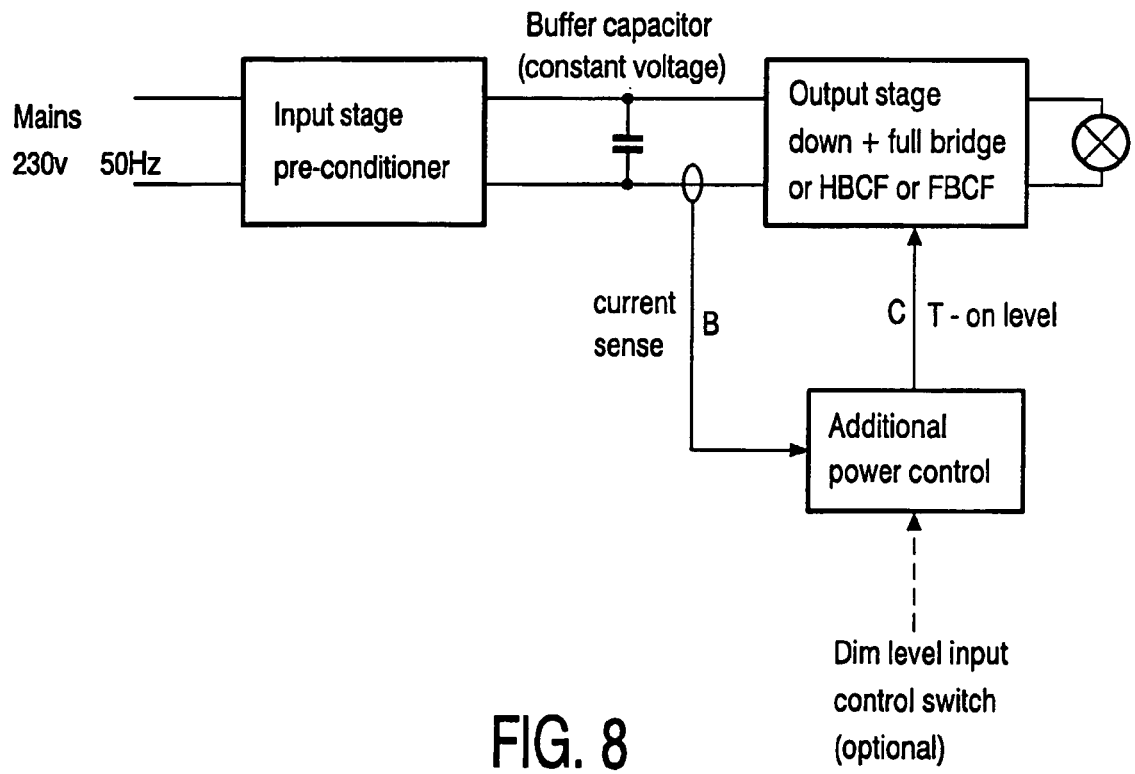
FIG. 8 shows a circuit diagram of a power controller with combined feedback and $T_{on}$ controller, including an optional dim level input switch.

Furthermore, FIG. 8 shows a diagram of a lamp and its ballast circuitry in a further embodiment, wherein the option of dimming of the lamp is provided. When the lamp power level is to be reduced from a fixed reference power level to a dimmed power level set by the user, the user operates an input control (not shown) which sends (A) a signal representative of the dim level to the additional power controller. The additional power controller then controls the $T_{on}$ controller (A) so as to indirectly control the $T_{on}$ time (B) of the power circuit (FIG. 7b) or reduces the $T_{on}$ time of the power circuit directly (FIG. 8), i.e. the down-converter circuit or the half/fill bridge commutating forward (FBCF/HBCF), accordingly.

In case of lamps showing a large variation in lamp voltage, a relatively slow power feedback loop is used to guarantee a correct power level over a broad voltage range. In this feedback loop (FIG. 8) the measured input current is fed back.

In case of a HBCF- or FBCF-topology an additional high-speed feedback loop may be implemented, as mentioned earlier. In this feedback loop the lamp voltage is measured, preferably indirectly to avoid differential lamp voltage measurement. In FIG. 7b line C represents a lamp-related signal such as the lamp voltage, which signal is fed back to the power controller. The additional power control circuitry uses this signal to have the $T_{on}$ controller reduce the $T_{on}$ time of the power circuit, which shifts the power curve over the lamp voltage axis accordingly.

The present invention is not limited to the above described preferred embodiment thereof; the rights sought are defined by the following claims, within the scope of which many modifications can be envisaged.

The invention claimed is:

1. A device for operating a high-pressure discharge lamp, said device comprising:
   a switched-mode power supply circuit for supplying power to the high-pressure discharge lamp from a supply voltage, the power supply circuit including at least one power switching element;
   control means for controlling the switched-on and switched-off states of said power switching element for controlling the power or current supplied to the high-pressure discharge lamp;
   wherein the control means are adapted to control the power consumed by the lamp during its steady phase or the current consumed by the lamp during its run-up phase by controlling the on-time ($T_{on}$) of the switched-on state of the at least one power switching element, wherein a value of the on-time ($T_{on}$) of the at least one power switching element is a preset value.

2. A device according to claim 1, wherein the preset value depends on the specifications of the discharge lamp.

3. A device according to claim 1, wherein the on-time ($T_{on}$) of the at least one power switching element for a specific discharge lamp type is substantially constant.

4. A device according to claim 1, comprising:
   input current determining means for determining the input current of the power supply, the input current determining means providing a signal representative of the determined input current;
   a feedback means through which said signal is fed back to the control means, wherein the control means are adapted to control the on-time ($T_{on}$) of the at least one switching element as a function of said feedback signal.

5. A device according to claim 1, comprising
   voltage determining means for determining the lamp voltage, the voltage determining means providing a signal representative of the determined lamp voltage,
   a feedback means through which said signal is fed back to the control means;
   wherein the control means are adapted to control the on-time ($T_{on}$) of the at least one power switching element as a function of said feedback signal.

6. A device according to claim 1, comprising a dim level means for setting a reduced lamp power level, the dim level means providing a signal representative of the dim level of the lamp, wherein the control means are adapted to control the on-time ($T_{on}$) of the at least one power switching element as a function of said signal.

7. A device according to claim 5, wherein the control means comprise a feedback controller for controlling the control means.

8. A device according to claim 7, wherein the control means are adapted to provide fast lamp power adjustments and the feedback controller is adapted to provide relatively slow lamp power adjustments.

9. A device for operating a high-pressure discharge lamp, said device comprising:
   a switched-mode power supply circuit for supplying power to the high-pressure discharge lamp from a supply voltage, the power supply circuit including at least one power switching element;
   control means for controlling the switched-on and switched-off states of said power switching element for controlling the power or current supplied to the high-pressure discharge lamp;
   wherein the control means are adapted to control the power consumed by the lamp during its steady phase or the current consumed by the lamp during its run-up phase by controlling the on-time ($T_{on}$) of the switched-on state of the at least one power switching element, wherein the on-time ($T_{on}$) is iteratively adapted with a iteration frequency lower than a switching frequency of the switched-mode power supply circuit.

10. A device according to claim 1, wherein the switching frequency of the switched-mode power supply is at least 100 kHz.

11. A device according to claim 9, wherein the iteration frequency is 100 Hz or less, preferably about 10 Hz or less.

12. A device according to claim 1, wherein use is made of a half or full-bridge power supply and a filter circuit comprising a series inductor (L) and at least one filter capacitor (C) parallel to the lamp.

13. A device according to claim 1, wherein the switched-mode power supply comprises a half-bridge or full-bridge commutating forward topology.

14. A device according to claim 1, wherein the switched-mode power supply comprises a down-converter.

15. A method of operating a high-pressure discharge lamp, comprising:

supplying power to the high-pressure discharge lamp from a supply voltage, using at least one power switching element;

controlling the power consumed by the lamp during its steady phase using control means; and presetting a value of the on-time $CT_{on}$) of the at least one power switching element;

wherein said control means control the lamp power during the steady state of the lamp by fixing the on-time ($T_{on}$) of the at least one power switching element.

16. A method according to claim 15, wherein the value of the on-time $CT_{on}$) is preset depending on specifications of the discharge lamp.

17. A method according to claim 15, wherein the on-time (Ton) of the at least one power switching element is kept substantially constant.

18. A method according to claim 15, comprising determining the lamp voltage, providing a signal representative of the determined lamp voltage, feeding said signal back to the control means and adapting the on-time ($T_{on}$) of the at least one power switching element as a function of the determined lamp voltage.

* * * * *